(12) United States Patent
Mochizuki

(10) Patent No.: US 10,362,763 B2
(45) Date of Patent: Jul. 30, 2019

(54) EXCREMENT-TREATING MATERIAL AND METHOD FOR MANUFACTURING SAME

(71) Applicants: PEPARLET CO., LTD., Shizuoka (JP); UNICHARM CORPORATION, Ehime (JP)

(72) Inventor: Shotaro Mochizuki, Shizuoka (JP)

(73) Assignees: PEPARLET CO., LTD., Shizuoka (JP); UNICHARM CORPORATION, Ehime (JP)

(*) Notice: Subject to any disclaimer, the term of this patent is extended or adjusted under 35 U.S.C. 154(b) by 549 days.

(21) Appl. No.: 15/032,630

(22) PCT Filed: Nov. 18, 2014

(86) PCT No.: PCT/JP2014/080461
§ 371 (c)(1),
(2) Date: Apr. 28, 2016

(87) PCT Pub. No.: WO2015/076246
PCT Pub. Date: May 28, 2015

(65) Prior Publication Data
US 2016/0249582 A1    Sep. 1, 2016

(30) Foreign Application Priority Data
Nov. 22, 2013  (JP) .................. 2013-242207

(51) Int. Cl.
*A01K 1/015* (2006.01)
*B29C 65/00* (2006.01)

(52) U.S. Cl.
CPC .......... *A01K 1/0154* (2013.01); *A01K 1/0152* (2013.01); *A01K 1/0155* (2013.01); *B29C 65/002* (2013.01)

(58) Field of Classification Search
CPC .... A01K 1/015; A01K 1/0152; A01K 1/0154; A01K 1/0155; A01K 1/0157;
(Continued)

(56) References Cited

U.S. PATENT DOCUMENTS 6,244,216 B1 * 6/2001 Ochi .................... A01K 1/0107
                                                            119/169
6,619,233 B1   9/2003 Mochizuki
(Continued)

FOREIGN PATENT DOCUMENTS

JP          2534031 B2    9/1996
JP      2003-274780 A     9/2003
(Continued)

OTHER PUBLICATIONS

International Search Report in PCT/JP2014/080461, dated Feb. 24, 2015.

*Primary Examiner* — Thanh Pham
(74) *Attorney, Agent, or Firm* — Hauptman Ham, LLP

(57) ABSTRACT

An excrement-treating material includes a water-absorbing core part, and a surface layer. The core part is formed by wet-kneading and compression-granulating a compounding material containing a paper powder and organic or inorganic fine pieces. Dents and/or protrusions are formed on the surface of the core part by deformation by the kneading or compression of the fine pieces or peeling-off of the fine pieces from the paper powder upon release of compression. The surface of the core part is discontinuously colored by utilizing the dents and/or protrusions, and covered with the surface layer. The colored parts of the surface of the core part are exposed through the surface layer during absorption of excreted urine, while the non-colored part of the surface (Continued)

of the core part is stained by the color of the excreted urine, and the color of the excreted urine is exposed through the surface layer.

5 Claims, 6 Drawing Sheets

(58) Field of Classification Search
CPC .... A01K 23/00; A01K 23/005; A01K 1/0353; A61F 5/44–4556
See application file for complete search history.

(56) References Cited

U.S. PATENT DOCUMENTS

| | | | |
|---|---|---|---|
| 2003/0196606 A1* | 10/2003 | Mochizuki | A01K 1/0155 |
| | | | 119/171 |
| 2004/0079292 A1* | 4/2004 | Mochizuki | A01K 1/0155 |
| | | | 119/171 |
| 2005/0160998 A1* | 7/2005 | Mochizuki | A01K 1/0152 |
| | | | 119/172 |
| 2013/0266657 A1* | 10/2013 | Trajkovska | A01K 1/0152 |
| | | | 424/490 |

FOREIGN PATENT DOCUMENTS

| | | |
|---|---|---|
| JP | 2012-55241 A | 3/2012 |
| JP | 2013-220381 A | 10/2013 |

* cited by examiner

F I G. 6
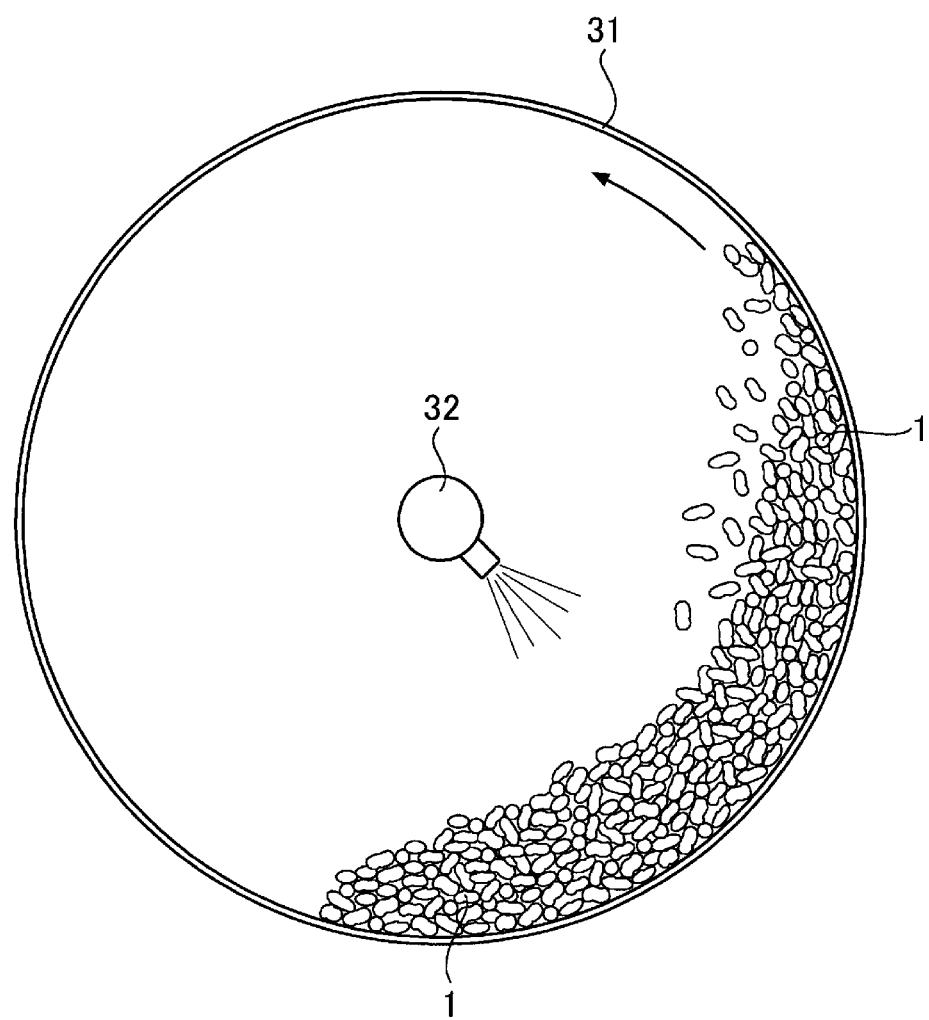

EXCREMENT-TREATING MATERIAL AND METHOD FOR MANUFACTURING SAME

RELATED APPLICATIONS

The present application is a National Phase entry of International Application No. PCT/JP2014/080461, filed Nov. 18, 2014, which claims priority of Japanese Application No. 2013-242207, filed Nov. 22, 2013.

TECHNICAL FIELD

The present invention relates to an excrement-treating material formed of a compression-granulated water-absorbing granule body and having a composite layer structure of a core part and a surface layer, and a method for manufacturing the material.

BACKGROUND ART

The following Patent Literature 1 discloses an excrement-treating material, which is premised on an excrement-treating material formed of a composite layer structure of a water-absorbing core part and a water-absorbing surface layer covering the surface of the core part, wherein the surface of the core part is colored, and the core part is covered with the surface layer having a color brighter than the color by which the surface of the core part is colored (including colors that are said to be colorless such as white), and when the excrement-treating material absorbs urine excreted from a cat, a dog or the like, the color on the surface of the core part is exposed through the surface layer that has got wet, whereby the excrement-treating material contributes to discrimination between before use and after use.

That is, since the above-mentioned excrement-treating material is such that the color of the colored outer surface of the core part is exposed through the surface layer upon absorption of urine from a cat, a dog or the like, the used part (the part on which urine has been excreted) and the unused part (the part on which urine has not been excreted) of the excrement-treating material can be easily discriminated by visual observation of the color by a user.

CITATION LIST

Patent Literature

Patent Literature 1: Japanese Patent No. 2534031

SUMMARY OF INVENTION

Technical Problem

In the excrement-treating material of the above-mentioned Patent Literature 1, as already mentioned above, since before use and after use can be easily discriminated by visually observing the color on the colored surface of the core part, unpleasant feeling is not provided to a user by the original color of the excrement from a cat, a dog or the like.

On the other hand, in the cases when the presence or absence of a urinary tract disease of a cat, a dog or the like is confirmed, and the like, a user desires to check health conditions by confirming the original color of excrement (specifically excreted urine).

The inventors did many trials and errors aiming at responding the user's desire to check health conditions by the original color of an excrement, while utilizing the advantage of the excrement-treating material of the above-mentioned Patent Literature 1 that before use and after use can be easily discriminated by confirming the color on the colored surface of the core part, and finally developed the present invention.

Solution to Problem

In summary, the excrement-treating material according to the present invention is premised on an excrement-treating material formed of a water-absorbing core part and a surface layer covering the core part, which exposes the color of the core part upon absorption of excreted urine, and has the following structure.

Specifically, the above-mentioned core part has a structure such that the core part is formed by wet-kneading and compression-granulating a compounding material containing a paper powder and organic or inorganic fine pieces as major materials, dents or/and protrusions are formed on the surface of the core part by deformation by the kneading or compression of the fine pieces or peeling-off of the fine pieces from the paper powder upon release of compression, the surface of the core part is discontinuously colored by utilizing these dents or/and the protrusions, the discontinuously-colored surface of the core part is covered with the surface layer, and the color of the colored parts of the surface of the core part can be exposed through the surface layer during absorption of excreted urine, whereas the non-colored part of the surface of the core part is stained the color of the excreted urine, and the color of the excreted urine can be exposed through the surface layer, and thus discrimination of before use and after use and checking of health conditions can be conducted simultaneously and properly.

Preferably, by using the dents or/and the protrusions are positively formed on the surface of the core part, paper pieces or plastic film pieces or superposed pieces of these pieces as the fine pieces.

In addition, a method for manufacturing an excrement-treating material according to the present invention is a method for manufacturing an excrement-treating material including a water-absorbing core part, and a surface layer covering the core part, which exposes the color of the core part upon absorption of excreted urine, and the method includes the following constitutions of A to D:

A: wet-kneading and compression-granulating a compounding material containing a paper powder and organic or inorganic fine pieces as major materials, and forming dents or/and protrusions on the surface of the core part by deformation by the kneading or compression of the fine pieces or peeling-off of the fine pieces from the paper powder upon release of compression;

B: discontinuously coloring the surface of the granulated core part by utilizing the dents or/and the protrusions;

C: covering the discontinuously-colored surface of the core part with the surface layer; and D: compression-bonding the surface layer to the surface of the core part.

Preferably, the dents or/and the protrusions are suitably formed on the surface of the core part by using paper pieces or plastic film pieces or superposed pieces of these pieces as the fine pieces.

More preferably, the dents or/and the protrusions are surely formed by using extrusion-granulation as the compression-granulating, presetting the diameter of each granulation holes to 2.5 mm to 6 mm, and using fine pieces each having a short direction width of 3 mm to 10 mm as the fine pieces.

Advantageous Effects of Invention

According to the excrement-treating material according to the present invention, upon absorption of excreted urine, the excrement-treating material can contribute to discrimination between before use and after use by exposing the color of the colored part of the surface of the core part through the surface layer, and can simultaneously contribute to checking of health conditions by staining the non-colored parts on the surface of the core part the color of the excreted urine and exposing the color of the excreted urine through the surface layer.

BRIEF DESCRIPTION OF DRAWINGS

FIG. 6 is an explanatory drawing schematically showing a coloring process.

FIGS. 7(A) and 7(B) are explanatory drawings schematically showing a surface layer compression bonding process, wherein FIG. 7(A) is a plane view of a compression bonding apparatus, and FIG. 7(B) is a perspective view schematically showing an internal structure of the compression bonding apparatus with partial cutaway.

DESCRIPTION OF EMBODIMENTS

The best mode of the present invention will be explained below based on FIGS. 1 to 7(B).

Figure 1:
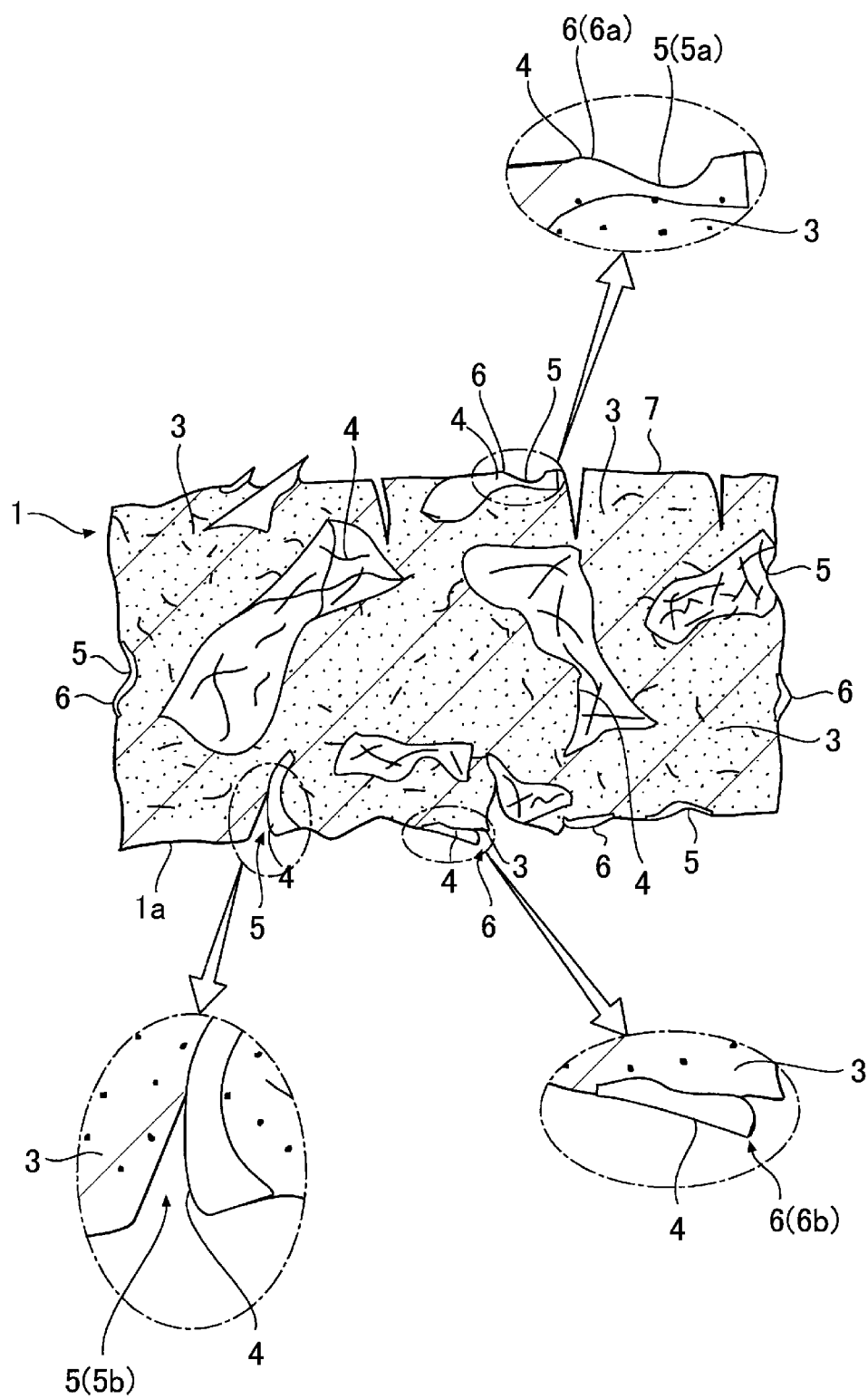
FIG. 1 is a cross-sectional drawing of a core part of an excrement-treating material according to the present invention.
Figure 2:
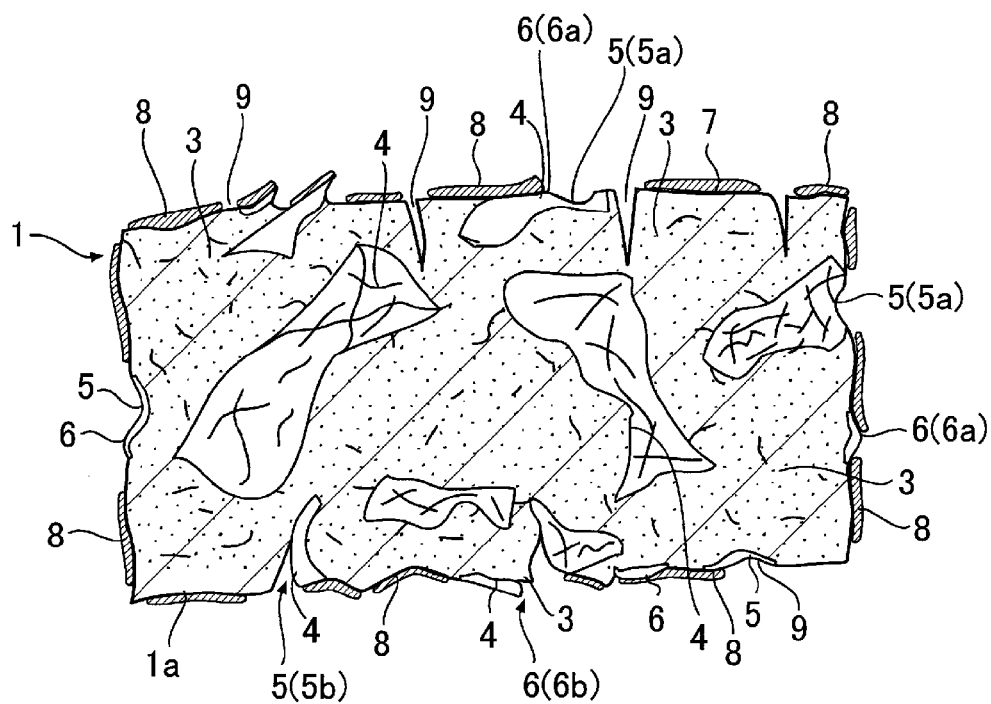
FIG. 2 is a cross-sectional drawing showing the state in which a surface of the core part has been colored.
Figure 3:
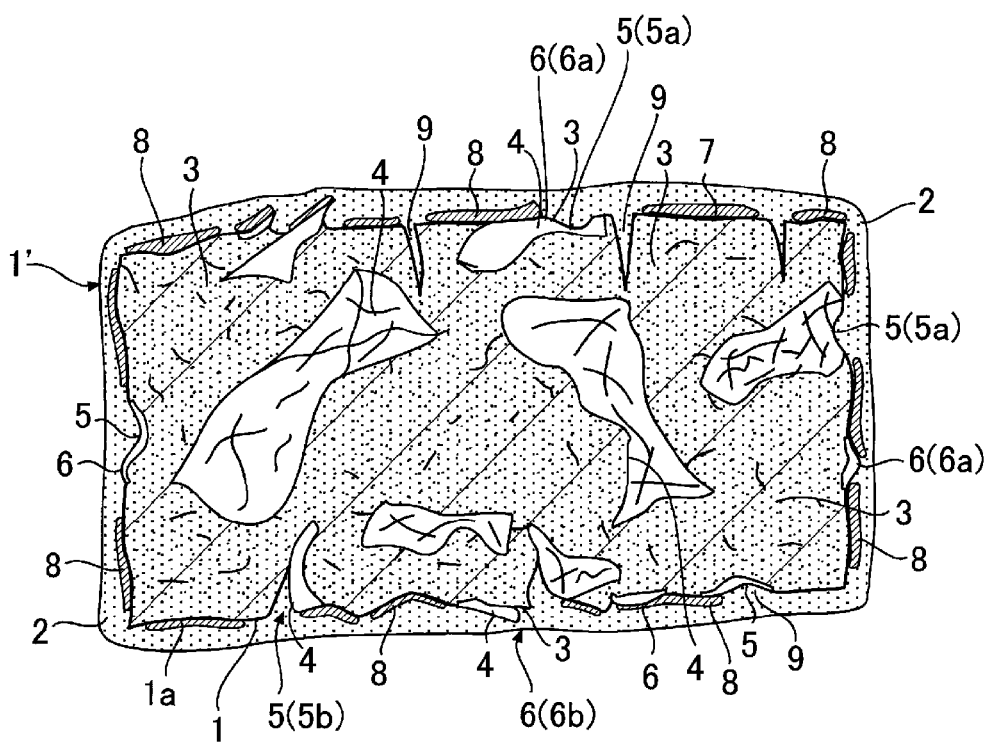
FIG. 3 is a cross-sectional drawing showing the state on which the surface of the colored core part is covered with a surface layer.

As shown in FIGS. 1 to 3, the excrement-treating material according to the present invention is premised on an excrement-treating material formed of a water-absorbing core part 1 and a surface layer 2 covering the core part 1, on which the color of the core part 1 is exposed upon absorption of excreted urine. Based on the respective drawings in FIGS. 1 to 3, the structure of the excrement-treating material according to the present invention will be mentioned in detail.

As shown in FIG. 1, the core part 1 is formed by wet-kneading and compression-granulating a compounding material containing a paper powder 3 and organic or inorganic fine pieces 4 as major materials, and has a structure such that dents 5 or/and protrusions 6 are formed on the surface 1a of the core part 1 by deformation of the fine pieces 4 during the kneading or compression, or peeling-off of the fine pieces 4 from the paper powder 3 upon release of compression, i.e., departing of a part of the paper powder 3 that has been integrated with the fine pieces 4 upon the compression, from the fine pieces 4.

5a in the drawing represents dents that have been formed by the deformation of the fine pieces 4, and 6a in the drawing shows protrusions that have been formed by the deformation of the fine pieces 4. Furthermore, 5b in the drawing shows cracked dents that have been formed by the peeling-off of the fine pieces 4 from the paper powder 3 upon release of the compression, and 6b in the drawing shows scaly protrusions that have been formed by the rolling back of the fine pieces 4 present on the surface 1a of the core part 1 during the compression-granulating, and the subsequent peeling-off of the fine pieces 4 from the paper powder 3.

In addition, paper pieces or plastic film pieces or superposed pieces of these are preferably used as the fine pieces 4. That is, paper pieces or plastic film pieces or superposed pieces of these are used singly or in combination as the fine pieces 4. As the plastic film pieces and the superposed pieces of the paper pieces and the plastic film pieces, for example, cut pieces of waste materials from paper diapers, sanitary products and the like are used. By incorporating the fine pieces 4, as mentioned above, dents 5 and protrusions 6 are imparted to the surface 1a of the core part 1.

Specifically, in the case when the plastic film pieces or the superposed pieces of the paper pieces and plastic film pieces are used as the fine pieces 4, the paper powder 3 is easily peeled off upon release of compression, and thus the cracked dents 5b are easily formed.

The paper powder 3 and the fine pieces 4, which are the major materials of the compounding material for the core part 1, are incorporated by a ratio of 10 to 30:70 to 90 by weight ratio, and a water-absorbing material such as water-absorbing polymers, an inorganic filler material such as bentonite, an adhesive material such as starch or CMC, and the like are suitably added thereto. If the ratio of the paper powder 3 is more than this range, then desired dents and protrusions are difficult to be formed, whereas if the ratio of the fine piece 4 is much, then many dents and protrusions are uselessly formed. In addition, as mentioned below, fine pieces that have been cut so as to have a short direction width of from 3 mm to 10 mm are used as the fine pieces 4.

Furthermore, as shown in FIG. 2, the excrement-treating material according to the present invention has a structure such that the core part surface 1a is discontinuously colored by utilizing the dents 5 or/and the protrusions 6, that is, colored parts 8 and non-colored parts 9 are formed on the surface 1a.

As shown in the same FIG. 2, the colored parts 8 are mainly formed on the protrusions 6 and the planar part 7, and the non-colored parts 9 are mainly formed on the dents 5 by the coloring process mentioned below. In addition, the colored parts 8 includes both of the case when the colored parts 8 are formed by the impregnation of a coating or a liquid color material such as a pigment from the surface 1a into the inner part, and the case when the colored parts 8 are formed by the solidification of the liquid color material on the surface 1a.

Although the color used for the coloring is not specifically limited, the color is set to be darker than the color of the surface layer 2 so as to be exposed through the surface layer 2 that has been wet. For example, in the case when the color of the surface layer 2 is white, the color used for the coloring can be blue, green, yellow, red or the like, but blue or green is desirable with considering for the visibility of the non-colored parts that are stained the color of excreted urine as mentioned below.

Furthermore, as shown in FIG. 3, in the excrement-treating material according to the present invention, under the state that the core part 1 is covered with the surface layer 2 to thereby form a composite layer structure, the compounding material for the surface layer 2 enters into the dents 5 and forms the surface layer 2 that suitably covers the core part 1.

As the compounding material for the surface layer 2, a water-absorbing polymer is incorporated together with organic fibers such as a paper powder or paper pieces. The organic fibers such as a paper powder or paper pieces as the compounding material for the surface layer are preferably prepared from virgin pulp (including pulp sludge), which has a high whiteness. This is because the color is set brighter than the color of the colored parts 8 on the surface 1$a$ of the core part and the color of excreted urine to thereby surely expose the color of the colored parts 8 and the color of excreted urine during the absorption of the excreted urine.

In the excrement-treating material according to the present invention 1' having the above-mentioned structure, the color of the colored parts 8 on the surface 1$a$ of the core part can be exposed through the surface layer 2 upon absorbing excreted urine, whereas the non-colored parts 9 of the surface 1$a$ of the core part are stained the color of the excreted urine, and thus the color of the excreted urine can be exposed through the surface layer 2, and discrimination of before use and after use and checking of health conditions can be conducted simultaneously and properly. The components of the color material and the like do not intervene in the non-colored parts 9, and the non-colored parts 9 smoothly absorb the excreted urine that has passed through the surface layer 2 and are stained the color of the excreted urine.

Secondly, the method for manufacturing an excrement-treating material according to the present invention will be explained in detail.

Figure 4:
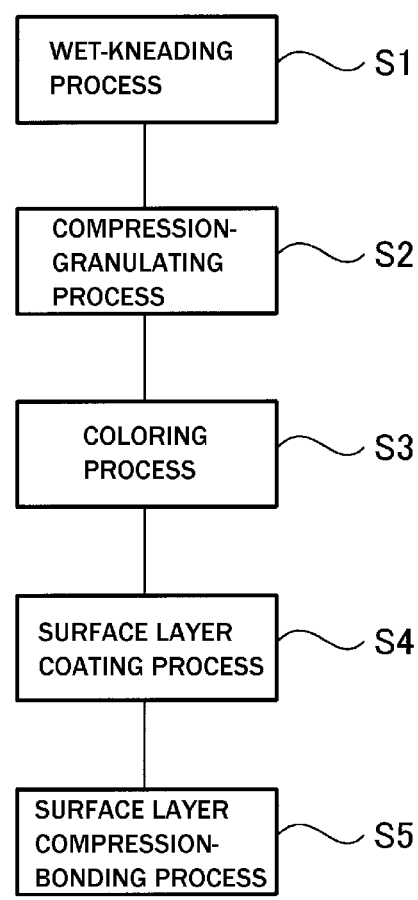
FIG. 4 is a flow chart schematically showing processes for a manufacture of the excrement-treating material.

As shown in FIG. 4, the method for manufacturing an excrement-treating material according to the present invention includes: processes of wet-kneading and compression-granulating a compounding material containing the paper powder 3 and the fine pieces 4 as major materials (a wet-kneading process S1 and a compression-granulating process S2); a process of discontinuously coloring the surface 1$a$ of the granulated core part 1 (a coloring process S3); a process of coating the discontinuously-colored core part 1 with the surface layer 2 (a surface layer coating process S4); and a process of compression-bonding the surface layer 2 to the surface 1$a$ of the core part 1 (a surface layer compression bonding process S5).

<Wet-kneading Process>

Firstly, in the wet-kneading process, the compounding material for the core part 1 is kneaded while the water content is adjusted by adjusting the amount of added water and the amount of the injection of the compounding material. By this kneading, the fine piece 4 in the compounding material is preliminarily deformed.

<Compression-granulating Process>

Figure 5:
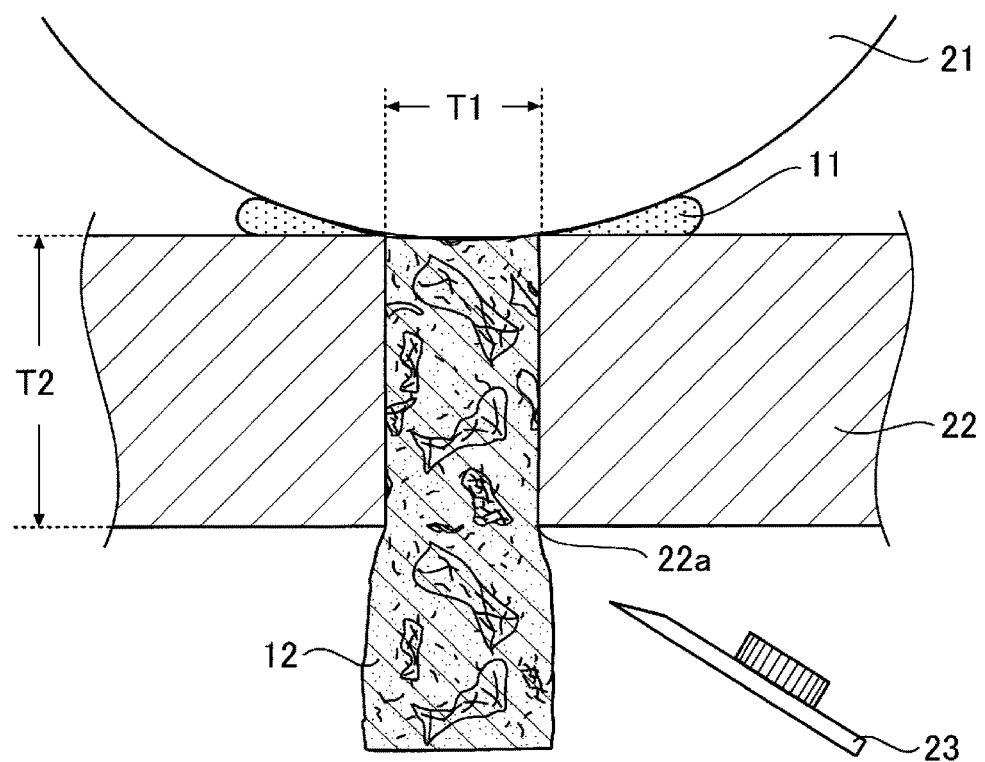
FIG. 5 is an explanatory drawing schematically showing a compression-granulating process.

Then, as shown in FIG. 5, the kneaded product 11 of the compounding material for the core part 1 which has undergone the wet-kneading process is compression-granulated in a known extrusion type compression granulator to thereby give a granulated product 12.

Specifically, the kneaded product 11 is press-fit into a granulation hole 22$a$ that has been formed in a die 22, by means of a pressurization roller 21, to thereby give the granulated product 12. During this compression, the fine pieces 4 are deformed. Furthermore, the diameter T1 of the granulation hole 22$a$ is preset to from 2.5 mm to 6 mm, fine pieces each having a short direction width of from 3 mm to 10 mm are used as the fine pieces 4 to promote the deformation of the fine pieces 4 during the compression, whereby the dents or/and the protrusions mentioned below are surely formed. The length T2 of the granulation hole 22$a$ is desirably from 30 mm to 40 mm, and is suitably adjusted depending on the residence time and press-fitting state of the kneaded product 11 mentioned below in the granulation hole 22$a$.

The above-mentioned granulated product 12 is swollen by the release of the compression at the outer end of the granulation hole 22$a$, and broken by a breaking blade 23 to give the core part 1.

During the release of the compression, the fine pieces 4 peel off from the paper powder 3, and cracked dents 5$b$ or/and scaly protrusions 6$b$ are formed on the surface 1$a$ of the core part 1. Furthermore, dents 5$a$ or/and protrusions 6$a$ are formed on the surface 1$a$ of the core part 1 by the deformed fine pieces 4. That is, as shown in FIG. 1, the dents 5 or/and the protrusions 6 are positively formed on the surface 1$a$ of the core part in this process.

In this process, the water content rate of the kneaded product 11 is adjusted to from 10 to 35% by weight to promote the peeling-off of the fine pieces 4 from the paper powder 3, and promote the formation of the dents 5 or/and the protrusions 6.

In addition, as mentioned above, the adequate ranges of the diameter T1 of the granulation hole 22$a$, the short direction width of the fine pieces 4 and the water content rate of the kneaded product 11 in forming the dents 5 and the protrusions 6 on the surface of the core part 1 in this process, and the embodiment for forming the dents 5 and the protrusions 6 can further be adjusted by the pressure for pressing the pressurization roller 21, the rotation number of the pressurization roller, and the injection amount of the kneaded product 11. The pressure for pressing the pressurization roller 21, the rotation number of the pressurization roller, and the injection amount of the kneaded product 11 (raw material) are as follows.

The pressure for pressing the pressurization roller 21 . . . from 15 to 20 MPS (from 150 to 200 kg/cm$^2$)

The rotation number of the pressurization roller 21 . . . from 100 to 140 rpm The injection amount of the kneaded product 11 . . . from 800 to 1,500 kg The pressure for pressing and rotation number of the pressurization roller 21, and the injection amount of the kneaded product 11 determine the amount of the press-fitting of the kneaded product 11 into the granulation hole 22$a$ per one rotation of the pressurization roller 21, and thus contribute to the formation of the dents 5 and the protrusions 6 on the core part 1, specifically formation of the scaly protrusions 6$b$. That is, by determining the amount of the kneaded product 11 that is intermittently press-fit into the granulation hole 22$a$ by means of the pressurization roller 21, the residence time and press-fitting state of the kneaded product 11 in the granulation hole 22$a$ are determined, whereby the scaly protrusions 6$b$ are formed.

<Coloring Process>

Subsequently, as shown in FIG. 6, the core part 1 is injected into a known shower drum 31, and a liquid color material is sprayed by means of a shower 32 while suspending the core part 1.

At this time, as shown in FIG. 2, the surface 1$a$ of the core part 1 is discontinuously colored by utilizing the dents 5 or/and the protrusions 6 formed as above. Specifically, the non-colored parts 9 are mainly formed on the dents 5, and the colored parts 8 are mainly formed on the protrusions 6. The colored parts 8 are mainly formed on the planar part 7 other than the dents 5 and the protrusions 6.

It is desirable that the ratio of the amount of the spraying of the liquid color material with respect to the weight of the core part 1 in this coloring process is such that the liquid color material is sprayed by from 40 ml to 80 ml with respect to 0.3 kg to 0.5 kg of the core part 1 (the core part 1 having a volume of about 1 L). The ratio is adjusted within the above-mentioned ratio in line with the increase or decrease of the core part 1, which is treated in this process.

<Surface Layer Coating Process>

Subsequently, the core part 1 whose surface 1*a* has been discontinuously colored as mentioned above is injected into a known coating drum together with a compounding material for the surface layer 2 to thereby coat the surface 1*a* of the core part 1 with the surface layer 2.

<Surface Layer Compression Bonding Process>

Subsequently, the surface layer 2 that is coating the core part 1 is compression-bonded. Specifically, as shown in FIGS. 7(A) and 7(B), the core part 1 (excrement-treating material 1') coated with the surface layer 2 is injected into a compression bonding apparatus 41 that finely oscillates up and down, and is transferred with providing repetitive oscillation up and down.

Figure 7A:
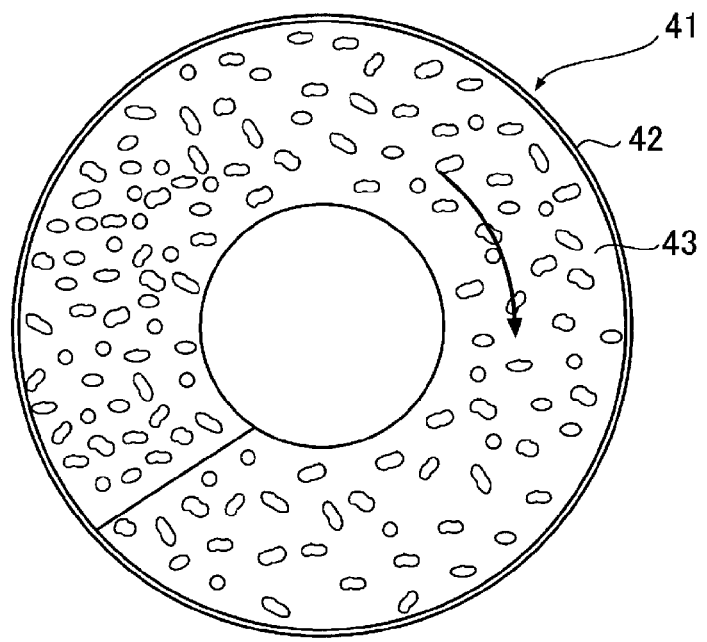
Figure 7B:
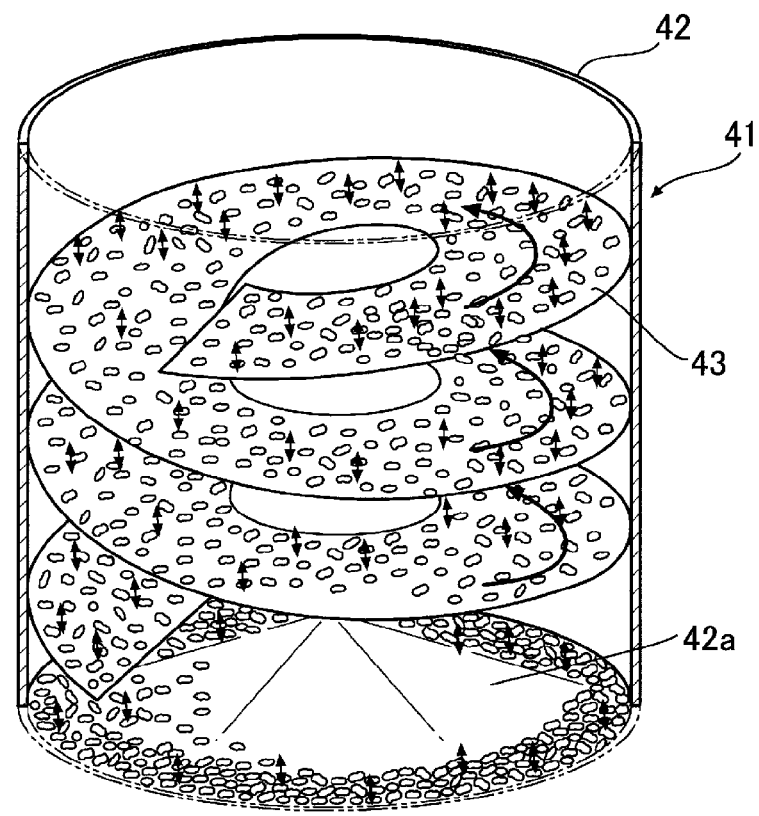

As shown in FIGS. 7(A) and 7(B), as the compression bonding apparatus 41, for example, an apparatus having a bottomed-cylindrical oscillating body 42 and a helical path 43 that follows the inner circumferential surface of the oscillating body 42 can be used.

By the oscillation in the vertical and horizontal directions provided to the oscillating body 42, the helical path 43 in the oscillating body 42 is also oscillated. As shown in FIGS. 7(A) and 7(B), the core part 1 coated with the surface layer 2, which has been injected into the upper end of the helical path 43, gradually transfers in the downward direction while the core part 1 oscillates up and down by the above-mentioned oscillation in the vertical and horizontal directions, and finally transfers in the horizontal direction while the core part 1 further oscillates up and down on a bottom plate 42*a* of the oscillating body 42. Furthermore, as shown in FIGS. 7(A) and 7(B), for example, if the above-mentioned bottom plate 42*a* is formed into a low-height conical form, then the core part 1 that is present on the bottom plate 42*a* can be collected along the inner circumferential surface of the oscillating body 42. Therefore, if the core part 1 is oscillated while the core part 1 is collected along the inner circumferential surface of the oscillating body 42 by this way, then the core part 1 is homogeneously mixed at an internal corner formed by the inner circumferential surface and the bottom plate 42*a* irrespective of the size and weight. Furthermore, for example, it is also possible to transfer the core part 1 along the inner circumferential surface (internal corner) of the oscillating body 42 also on the helical path 43 by the width, direction, timing and the like of the oscillation provided to the oscillating body 42.

As mentioned above, by transferring the core part 1 coated with the surface layer 2 by while oscillating the core part 1 up and down, the surface of the surface layer 2 is evenly hit on the helical path 43 or the bottom plate 42*a*, whereby the surface layer 2 is compression-bonded to the surface 1*a* of the core part.

In addition, as another example of the compression bonding apparatus 41 explained above, it is an optional format depending on operation to dispose a cyclic plate with cutaway part(s) of a single stage or multiple stages instead of the helical path 43, and to allow the core part 1 to sequentially fall through the cutaway part(s) while applying oscillation on the cyclic plate, to finally provide oscillation on the bottom plate 42*a*. Alternatively, the compression bonding of the surface layers may also be by using, for example, a conveyor having an oscillation-generating part.

As shown in FIG. 3, by the surface layer compression bonding process, the compounding material for the surface layer 2 enters into the dents 5 to form the surface layer 2 that is suitably covering the core part 1, whereby an excrement-treating material having a composite layer structure can be manufactured. Specifically, the compounding material for the surface layer 2 which has entered into the dents 5 plays a role as an anchor that prevents the peeling off of the surface layer 2, and in the case when the compounding material receives excreted urine, the compounding material plays a role of a conduit tube to thereby quickly stain the non-colored parts 9 the color of the excreted urine. It is specifically important to prevent the peeling off of the surface layer 2 in the excrement-treating material according to the present invention, which does not expose the color of the colored parts 8 of the core part 1 before use but exposes the color of the colored parts 8 only after use.

The present invention is premised on the concept of the conventional art in which the color of the surface layer 2 is set brighter than the color of the core part 1 to give a difference to the degrees of brightness, to thereby enables the exposure of the color of the core part 1 through the surface layer 2 upon absorption of excreted urine, and discloses the concept that the colored parts 8 and the non-colored parts 9 are positively formed on the surface 1*a* of the core part 1 so that the color of the former can be exposed through the surface layer 2 during absorption of the excreted urine absorb and the latter is simultaneously stain the color of the excreted urine color so that the color of the excreted urine color can be exposed through the surface layer 2.

According to the excrement-treating material according to the present invention, the excrement-treating material can contribute to discrimination of before use and after use by exposing the color of the colored parts 8 of the surface 1*a* of the core part through the surface layer 2 upon absorption of excreted urine, and since the non-colored parts 9 on the surface 1*a* of the core part is stained the color of the excreted urine, the excrement-treating material can simultaneously contribute to checking of health conditions by exposing the color of the excreted urine through the surface layer 2.

REFERENCE SIGNS LIST

1 . . . core part, 1*a* . . . surface, 1' . . . excrement-treating material, 2 . . . surface layer, 3 . . . paper powder, 4 . . . fine piece, 5 . . . dent, 5*a* . . . dent formed by deformation of fine piece, 5*b* . . . cracked dent, 6 . . . protrusion, 6*a* . . . protrusion formed by deformation of fine piece, 6*b* . . . scaly protrusion, 7 . . . planar part, 8 . . . colored part, 9 . . . non-colored part, 11 . . . kneaded product of compounding material of core part, 12 . . . compression-granulated product, 21 . . . pressurization roller, 22 . . . die, 22*a* . . . granulation hole, 23 . . . breaking blade, 31 . . . shower drum, 32 . . . shower, 41 . . . compression bonding apparatus, 42 . . . oscillating body, 42*a* . . . bottom plate, 43 . . . helical path, S1 . . . wet-kneading process, S2 . . . compression-granulating process, S3 . . . coloring process, S4 . . . surface layer coating process, S5 . . . surface layer compression bonding process, T1 . . . diameter of granulation hole, T2 . . . length of granulation hole.

The invention claimed is:

1. An excrement-treating material, comprising:
a water-absorbing core part; and
a surface layer covering the core part, wherein the surface layer exposes a color of a surface of the core part upon absorption of excreted urine,
wherein the core part is formed by wet-kneading and compression-granulating a compounding material containing a paper powder and organic or inorganic fine pieces as major materials, dents or/and protrusions are formed on the surface of the core part by deformation by the kneading or compression of the fine pieces or peeling-off of the fine pieces from the paper powder upon release of compression, the surface of the core part is discontinuously colored by utilizing the dents or/and the protrusions to form a colored part and a non-colored part, the discontinuously-colored surface of the core part is covered with the surface layer, and the color of the colored part of the surface of the core part is exposed through the surface layer during absorption of the excreted urine, whereas the non-colored part of the surface of the core part is stained by a color of the excreted urine, and the color of the excreted urine is exposed through the surface layer.

2. The excrement-treating material according to claim 1, wherein the fine pieces are paper pieces or plastic film pieces, or superposed pieces of these pieces.

3. A method for manufacturing an excrement-treating material comprising a water-absorbing core part, and a surface layer covering the core part, wherein the surface layer exposes a color of the core part upon absorption of excreted urine, the method comprising the following constitutions of A to D:

A: wet-kneading and compression-granulating a compounding material containing a paper powder and organic or inorganic fine pieces as major materials, and forming dents or/and protrusions on a surface of the core part by deformation by the kneading or the compression of the fine pieces or peeling-off of the fine pieces from the paper powder upon release of compression;

B: discontinuously coloring the surface of the granulated core part by utilizing the dents or/and the protrusions;

C: covering the discontinuously-colored surface of the core part with the surface layer; and D: compression-bonding the surface layer to the surface of the core part.

4. The method for manufacturing an excrement-treating material according to claim 3, wherein the fine pieces are paper pieces or plastic film pieces, or superposed pieces of these pieces.

5. The method for manufacturing an excrement-treating material according to claim 3, wherein the compression-granulating is extrusion-granulation, a diameter of each granulation holes is from 2.5 mm to 6 mm, and the fine pieces each has a short direction width of from 3 mm to 10 mm.

* * * * *